(12) United States Patent
Van Tilburg et al.

(10) Patent No.: US 11,326,671 B2
(45) Date of Patent: May 10, 2022

(54) TRANSMISSION AND VEHICLE PROVIDED WITH SUCH A TRANSMISSION

(71) Applicant: DRIVE TECHNOLOGY HOLLAND LTD. [NL/NL], Best (NL)

(72) Inventors: Marinus Johannes Cornelis Van Tilburg, Best (NL); Henricus Josephus Maria Essens, Best (NL); Johannes Constant Maria De Wijs, Best (NL); Hubertus Hendrikes Adrianus Van Kasteren, Best (NL)

(73) Assignee: Drive Technology Holland Ltd., Best (NL)

( * ) Notice: Subject to any disclaimer, the term of this patent is extended or adjusted under 35 U.S.C. 154(b) by 392 days.

(21) Appl. No.: 16/316,420

(22) PCT Filed: Jul. 10, 2017

(86) PCT No.: PCT/NL2017/050461
§ 371 (c)(1),
(2) Date: Jan. 9, 2019

(87) PCT Pub. No.: WO2018/012966
PCT Pub. Date: Jan. 18, 2018

(65) Prior Publication Data
US 2019/0226560 A1    Jul. 25, 2019

(30) Foreign Application Priority Data

Jul. 11, 2016  (NL) ...................................... 2017150

(51) Int. Cl.
*F16H 9/24*    (2006.01)
*F16H 55/54*   (2006.01)
*F16H 9/10*    (2006.01)

(52) U.S. Cl.
CPC ................ *F16H 9/24* (2013.01); *F16H 9/10* (2013.01); *F16H 55/54* (2013.01)

(58) Field of Classification Search
CPC ... F16H 9/10; F16H 9/24; F16H 55/54; F16H 7/02
See application file for complete search history.

(56) References Cited

U.S. PATENT DOCUMENTS 1,173,787 A  *  2/1916  Dunbar .................. F16H 55/54
                                                474/54
1,446,294 A       2/1923  Healey
(Continued)

FOREIGN PATENT DOCUMENTS

BE    1000965 A5    5/1989
EP    1 460 309 A2  9/2004
(Continued)

OTHER PUBLICATIONS

Machine Translation of SU 1218214 A1. (Year: 1986).*
International Search Report for International Application No. PCT/NL2017/050461 dated Nov. 7, 2017.

*Primary Examiner* — Michael R Mansen
*Assistant Examiner* — Juan J Campos, Jr.
(74) *Attorney, Agent, or Firm* — Suiter Swantz pc llo

(57) ABSTRACT

The invention relates to a transmission comprising two circulating elements and a transmission element, such as a toothed belt. At least one circulating element comprises a number of contact elements for contact with the transmission element which determine a running radius of the transmission element, a radial guide for the contact elements, along which the latter are radially displaceable, displacement means for displacing the contact elements in the radial direction, wherein the transmission element has engagement elements such as teeth. Each of the contact elements comprises a base part which is in contact with the (Continued)

radial guide and with the displacement means, and an engagement member which is connected to the base part and is radially movable with respect to the base part, wherein the engagement member of at least one of the number of contact elements of the respective circulating element is in positive-locking contact with the transmission element.

16 Claims, 8 Drawing Sheets

(56) References Cited

U.S. PATENT DOCUMENTS

| | | | | |
|---|---|---|---|---|
| 4,498,351 A * | 2/1985 | Ahoor | ............. | F16H 9/10 474/47 |
| 4,516,960 A * | 5/1985 | Rathert | ............. | F16H 55/54 474/47 |
| 4,832,660 A * | 5/1989 | Leonard | ............. | B62M 9/08 474/49 |
| 5,476,422 A * | 12/1995 | Schendel | ............. | B62M 9/08 474/49 |
| 5,492,506 A | 2/1996 | Lorance | | |
| 2003/0166426 A1 | 9/2003 | Anderson | | |
| 2007/0243969 A1 * | 10/2007 | Siman-Tov | ............. | F16H 55/54 476/5 |
| 2008/0214345 A1 * | 9/2008 | Khan | ............. | F16H 9/24 474/231 |
| 2014/0162816 A1 * | 6/2014 | Clopet | ............. | F16H 9/24 474/49 |
| 2017/0146102 A1 * | 5/2017 | Siman-Tov | ............. | F16H 9/10 |
| 2017/0328448 A1 * | 11/2017 | Tange | ............. | F16H 55/54 |
| 2017/0370450 A1 * | 12/2017 | Van Tilburg | ............. | F16G 1/28 |

FOREIGN PATENT DOCUMENTS

| | | |
|---|---|---|
| GB | 551690 A | 3/1943 |
| SU | 1218214 A | 3/1986 |

* cited by examiner

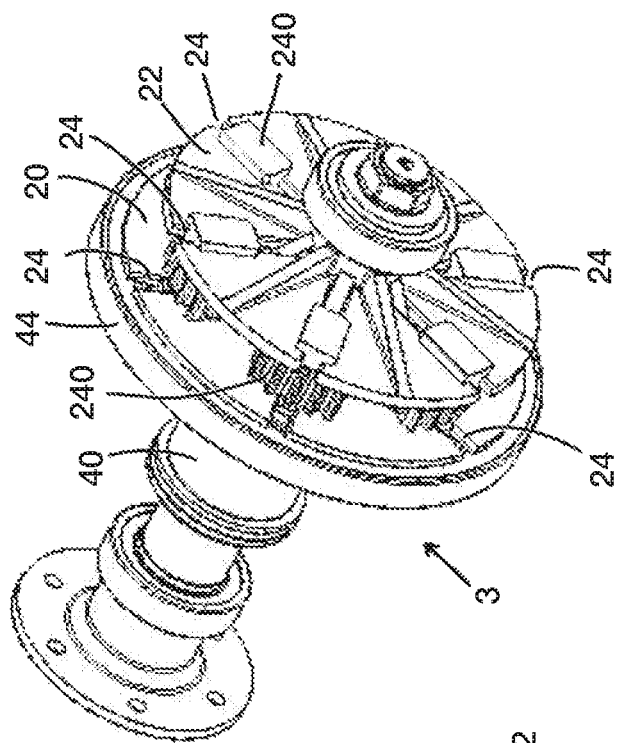
Fig. 2a
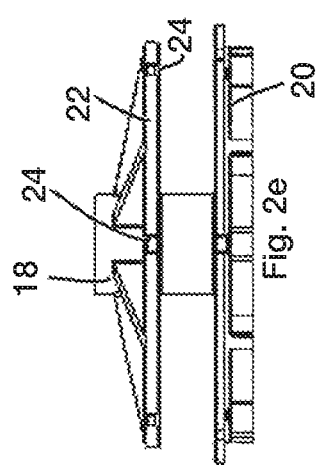
Fig. 2e
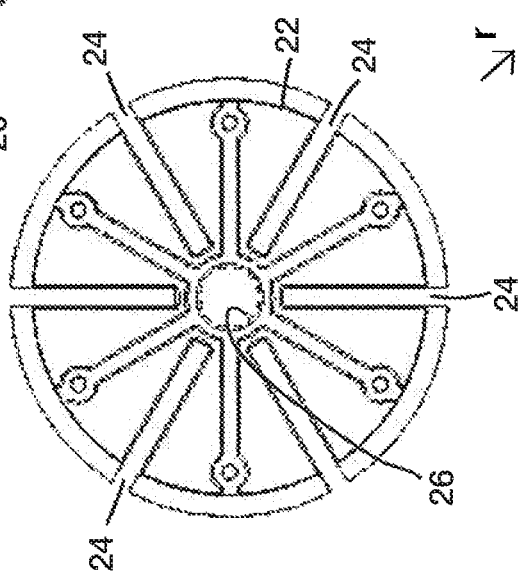
Fig. 2b
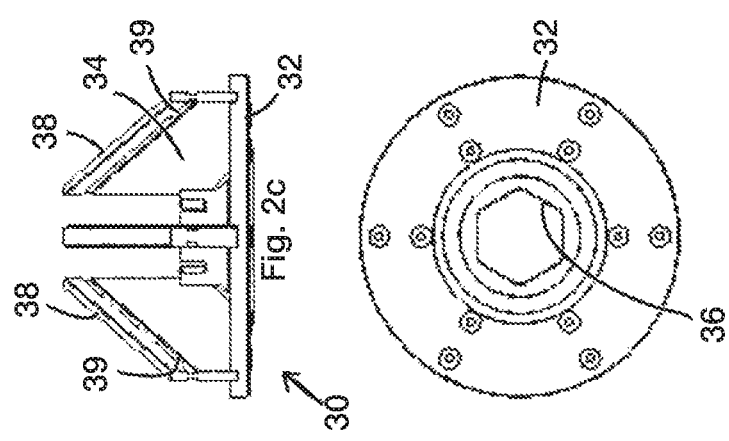
Fig. 2c
Fig. 2d

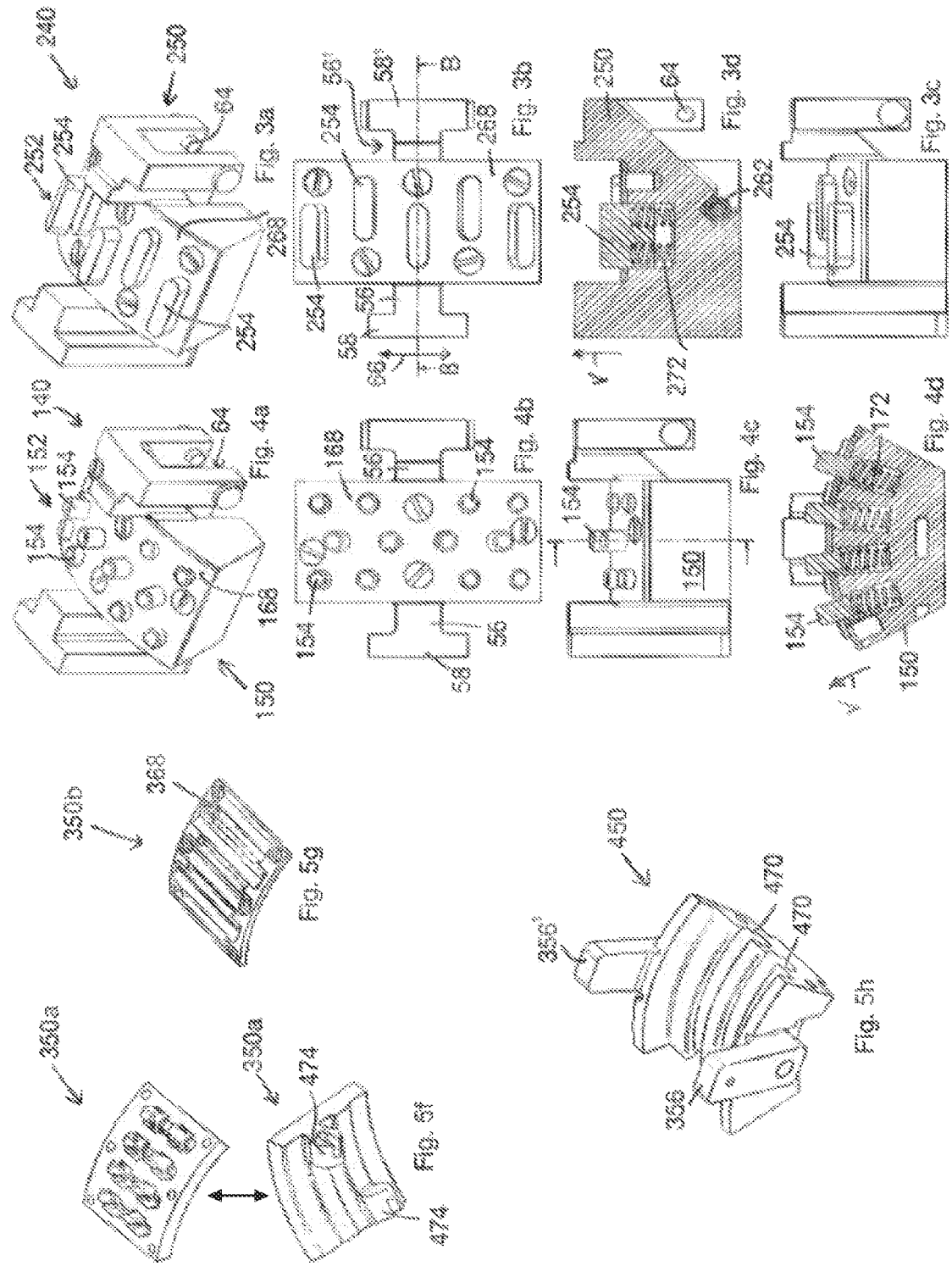

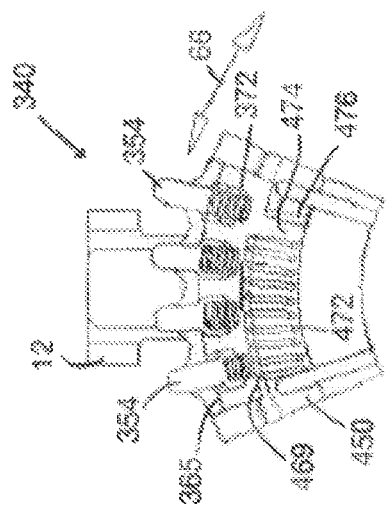
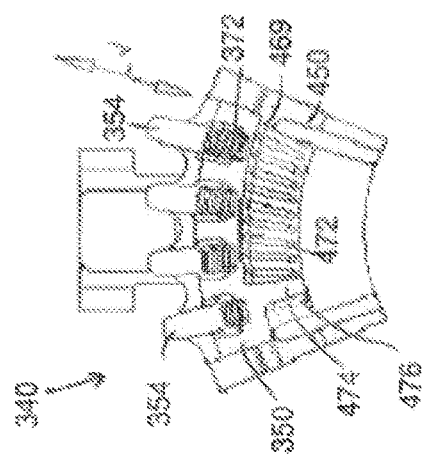
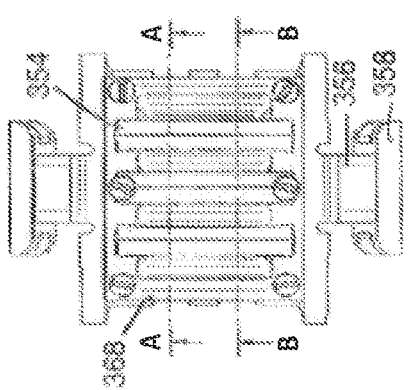
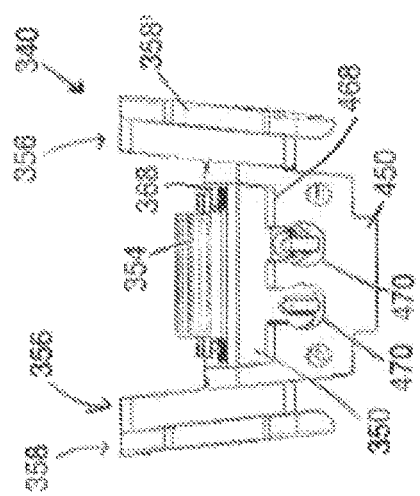
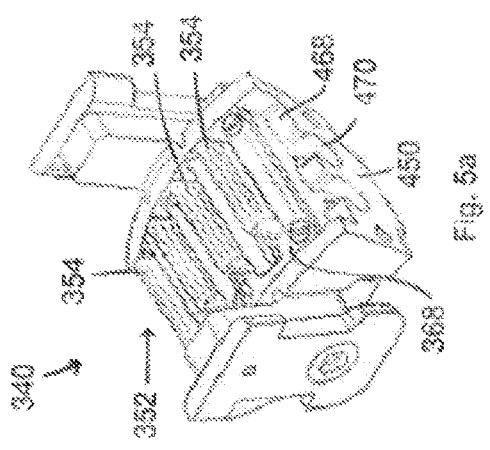

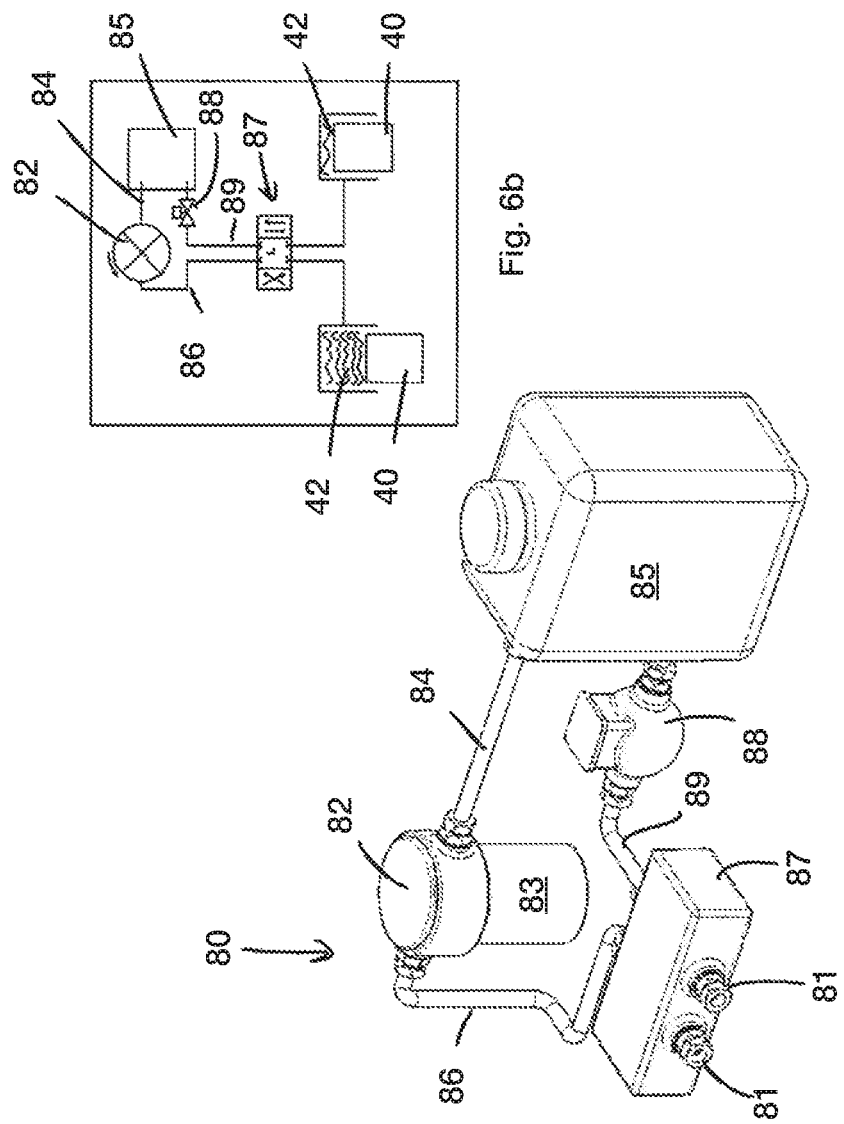

TRANSMISSION AND VEHICLE PROVIDED WITH SUCH A TRANSMISSION

TECHNICAL FIELD AND BACKGROUND

The present invention relates to a transmission.

GB 2239063 relates to a continuously variable transmission comprising two pulleys around which a belt is passed. With this transmission, use is made of a conical body by means of which the running radius of the belt on a pulley is increased or decreased by radial displacement of contact blocks.

U.S. Pat. No. 5,492,506 discloses a pulley for a transmission. The pulley has contact blocks which can be moved to and fro radially between two discs. The contact blocks determine the running radius of a toothed belt passed around the pulley. The contact blocks have a toothed profile for engagement with the toothed belt. An advantage of the pulley according to U.S. Pat. No. 5,492,506 with respect to the transmission from GB 2239063 is the fact that, due to the positive-locking contact between the contact blocks and toothed belt, problems with regard to slipping between the two are prevented. A drawback of the known pulley according to U.S. Pat. No. 5,492,506 is the fact that the running radius of the pulley can, in practice, only be adjusted to a limited number of discrete positions. As a result, the range of application is limited and the actuation is relatively complicated.

BRIEF SUMMARY

It is therefore an object of the present invention to provide a transmission with an increased range of application and the possibility of simpler actuation.

Said object is achieved by the transmission according to claim 1, comprising a first circulating element rotatable about a first rotation axis, a second circulating element rotatable about a second rotation axis, an elongate flexible continuous transmission element which is passed around both the first circulating element and the second circulating element, at least one of the first and second circulating elements comprising:
- a number of contact elements which are distributed around the rotation axis of the respective circulating element for contact with the transmission element, which contact elements determine a running radius on which the transmission element is passed around the respective circulating element,
- a radial guide for each of the contact elements, along which the respective contact elements can be moved to and fro radially between an inner radial position and an outer radial position,
- displacement means for moving the contact elements to and fro in the radial direction between the inner and the outer position, wherein the transmission element is provided with a number of engagement elements which are provided at a regular pitch on a side facing the contact elements, and each of the contact elements comprising
- a base part which is in operative contact with the radial guide and with the displacement means, and
- an engagement member which is connected to the base part and can be moved in a radial direction with respect to the base part, wherein the engagement member of at least one of the number of contact elements of the respective circulating element is in positive-locking contact with at least one engagement element of a number of engagement elements of the transmission element.

The transmission according to the invention comprises contact elements which each have a base part and an engagement member which can be moved radially with respect thereto. The contact elements may be positioned on any radial position between the inner and the outer radial position. This determines the running radius of the transmission element. Furthermore, at each radial position, positive-locking contact by at least one of the contact elements with the transmission element is achieved, or at least ensured to an improved degree, by the fact that the engagement member thereof can move radially with respect to the associated base part. In this way, the engagement member can position itself with respect to the transmission element in such a way that the positive-locking contact can be achieved where the engagement member of at least one of the contact elements is situated in such a relative position with respect to an engagement element of the transmission element that the positive-locking contact can be made. In this case, engagement members of further contact elements can move radially in such a way that they do not affect the running radius, or do so only to a limited degree. Due to the fact that the base part of the contact elements according to the invention can thus be positioned on all positions, from the inner to the outer position, while maintaining the positive-locking contact, the actuation of the displacement means can be significantly simplified. In addition, this increases the range of application of the transmission. This is not possible with the above-described known pulley due to the fixed, non-modifiable distance between at least the teeth on the contact blocks at a certain radial position. For the major part of the radial positions, this distance does not correspond to an integer times the pitch of the teeth of the contact blocks, as a result of which cooperation with a toothed belt is not possible at these radial positions, or is only possible with unacceptable influencing of the running radius of the toothed belt.

Preferably, each of the contact elements is configured to be displaceable only to and fro radially between the inner radial position and the outer radial position along the radial guide.

More preferably, the base part comprises blocking elements to limit the movement of the engagement part between a first and a second end position with respect to the base part.

It is particularly advantageous if the engagement member is configured to be able to move in a radial direction on account of the engagement member and an engagement element of the number of engagement elements of the transmission element coming into contact with each other during rotation of the circulating element. In this way, automatic positive-locking contact is achieved during operation. In other words, the engagement members automatically position themselves during operation. It is advantageous if, for this purpose, engagement elements of the transmission element and/or the engagement member have bevelled or rounded edges or flanks at the location of the respective portions thereof which, in operation, during rotation of the circulating element, come into contact with each other. As a result hereof, positive-locking contact is readily achieved, despite suboptimal mutual positioning immediately before a first contact during rotation of the circulating element.

Preferably, the engagement elements of the transmission element are formed by teeth, preferably having bevelled or rounded tooth flanks.

It is furthermore advantageous if each contact element of the number of contact elements comprises a spring member which is active between the base part and the engagement member to move the engagement member to a predetermined neutral position, at least when there is no contact between the engagement member and transmission element.

In an embodiment, the engagement member is formed by a plurality of individual lug elements which are radially movable with respect to the base part of the contact element and which are preferably arranged at at least substantially the same mutual pitch as the pitch between the engagement elements of the transmission element.

Alternatively, it is conceivable for the engagement member to be formed by a plurality of lug elements which are radially movable with respect to the base part of the contact element and which are arranged at a varying mutual pitch compared to the pitch between the engagement elements of the transmission element. As a result, there is a greater degree of certainty that positive-locking contact will be achieved.

Preferably, the base part has an external surface which is curved in the direction of rotation of the transmission element around the respective circulating element, wherein, in the first end position, the engagement member is recessed completely radially below the external surface in the base part and, in the second end position, projects radially above the external surface. As a result, during operation, there is either positive-locking contact or, if recessed, the engagement member has no adverse influence on the mutual contact between the transmission element and contact element. Preferably, the predetermined position is here the second end position of the engagement member.

Alternatively, the base part has an external surface which is curved in the direction of rotation of the transmission element around the respective circulating element, wherein, in the second end position, the engagement member radially projects relatively further beyond the external surface and, in the first end position, radially projects relatively less far beyond the external surface of the base part, wherein the predetermined position is the second end position of the engagement member. As a result, on account of the engagement member and an engagement element of the number of engagement elements of the transmission element coming into contact with each other during rotation of the circulating element, this contact is smoothly brought about due to the fact that, upon first contact, the engagement member is situated in the second, more radially projecting position, following which the engagement member, or a part thereof, such as some of the abovementioned lugs, moves to the first position on account of the transmission element.

In a preferred embodiment, preferably in combination with the abovementioned embodiment of an engagement member which, in its second end position, projects relatively less far above the external surface, the engagement member is also movable in a direction of rotation of the transmission element around the respective circulating element with respect to the base part of the contact element. As a result, the engagement member can be positioned optimally with respect to the transmission element to an even greater degree.

In this case, it is advantageous if the contact element furthermore comprises a connecting piece, wherein the engagement member is held to the connecting piece so as to be movable in a radial direction, wherein the connecting piece is connected to the base part so as to be movable in the direction of rotation of the transmission element around the respective circulating element with respect to the base part of the contact element. As a result, the radial movement is separated from the movement in the direction of rotation in an efficient manner.

In this case, it is advantageous if the base part has an external surface which is curved in the direction of rotation and along which the connecting piece is movable in the direction of rotation. As a result, the engagement part of the contact element can readily be subjected to a movement in the direction of rotation via the connecting piece.

In this case, it is advantageous if the connecting piece is curved in the direction of rotation, wherein a curvature of an internal surface thereof facing the base part corresponds to the curvature of the external surface of the base part. As a result, a sliding contact with a high load-bearing capacity can be achieved.

The transmission element is preferably a toothed belt or a chain, such as a toothed chain.

It is advantageous if each contact element of the number of contact elements comprises a further spring member which is active between the base part and the connecting piece in order to move the connecting piece to a predetermined neutral position, at least when there is no contact between the engagement member and transmission element.

In this case, it is advantageous if a distance over which the connecting piece can be displaced in the direction of rotation is at least equal to the pitch between the engagement elements of the transmission element and is preferably in the range of 1 or 2 times said pitch, and wherein preferably the neutral position of the connecting piece is situated midway along said distance. More preferably, the distance is in the range of 1.2 to 2 times the pitch, still more preferably approximately 1.5 times the pitch.

It is advantageous if the predetermined position is a centre position, which is situated, at least approximately, in the centre between the first and second end position. As a result, the engagement member can move in two directions in the direction of rotation, either following the sense of revolution of the circulating element or going counter to it. As a result, it is ensured to a high degree that the positive-locking contact is achieved.

It is furthermore advantageous if the circulating element comprises a first disc element and a second disc element, which is parallel to the first, each of which comprise a first or second radial guide element, such as a slot or rib, respectively, for each contact element, which radial guide elements form the radial guide, wherein the number of contact elements is situated between the first and second disc element, that is to say axially enclosed. The radial guide elements are very preferably evenly distributed along the circumference of the respective disc element. Preferably, the radial guide element of the first and/or the second disc element comprises a slot and the base part of each of the contact elements extends into a first and/or second slot, respectively, associated with that contact element. The base part furthermore preferably has such a block shape that it fills a distance between the first and second disc element. In other words, the base part is then enclosed between the first and second disc element in the axial direction by means of a sliding fit and can move in the radial direction between said disc elements due to the presence of the radial guide.

Preferably, the base part is in contact with the displacement means on the side of the first disc element, and furthermore comprises, on the side of the second disc element, an axial contact surface which bears against the second disc element.

It is furthermore advantageous if the displacement means comprise at least one displacement element with a wedge face, wherein the wedge face and the contact elements are in contact with each other, wherein the at least one displacement element can be moved to and fro in the axial direction with respect to the rotation axis of the circulating element between a first axial position, in which the contact elements are in the inner radial position, and a second axial position, in which the contact elements are in the outer radial position, wherein the contact elements move along the wedge face during such an axial displacement.

In this context, it is furthermore advantageous if the displacement means for each of the contact elements comprise a separate wedge face which is provided on a respective pressure element of the displacement element of the displacement means, which pressure elements are each positioned and configured such that they can each at least partly extend through an associated slot in the first disc element. As a result, it is possible to achieve a compact construction of the transmission, also viewed axially. In their base part, the contact elements preferably have a recess which is provided in line with the slot in the first disc element and which is adapted to the shape of the wedge face in such a way that the pressure element with the wedge face extends into the base part of the contact elements via the slot in the first disc element so that it can be in contact with the base part under the engagement member of the contact elements.

In this case, at least in the outer radial position of the contact elements, the pressure elements preferably extend at least partly through the associated slot in the first disc element.

In order to keep the contact elements in contact with the pressure elements of the displacement element and to prevent the contact elements from inadvertently moving radially outwards on account of the centrifugal force at an increased rotary speed of the circulating element during operation, the contact elements preferably each comprise a guide projection and the associated respective pressure elements each comprise a guide groove which extends parallel to the wedge face in the pressure element and which is configured to receive the guide projection and at the same time keep the contact element in contact with the wedge face. During the radial displacement of the contact element, the guide projection then thus moves through the guide groove and the contact element is prevented from becoming detached from the pressure element.

Preferably, the displacement means comprise a chamber for a pressure medium, which chamber is operatively connected to the displacement element in such a way that the displacement element is displaced axially on account of a change in the pressure of the pressure medium in the chamber. Preferably, the chamber is configured to be able to keep a hydraulic or pneumatic pressure medium, more preferably a hydraulic oil, therein under pressure.

Preferably, the circulating element is provided with four to twelve contact elements, preferably six to eight.

Preferably, both the first and the second circulating element are provided with contact elements in the above-described way. More preferably, the first and second circulating element are at least substantially identical in design.

It is furthermore advantageous if each of the contact elements comprises a rolling wheel which is attached to the base part, which rolling wheel is configured to roll over the wedge face during the axial displacement of the displacement element. In the case of contact elements comprising an abovementioned recess, the rolling wheel is preferably positioned in such a manner that contact between contact element and wedge face, viewed radially, takes place at least approximately in the centre under the engagement member of that contact element.

In an embodiment of a transmission according to the invention, the circulating element comprising the contact elements according to the invention, preferably both circulating elements, is a conical disc circulating element, wherein the displacement means are formed by an axially displaceable conical disc of the conical disc circulating element. A conical disc circulating element is an embodiment of a circulating element which is well-known per se and is used in continuously variable transmissions for the automotive industry, wherein the transmission element is a push belt a CVT chain. Such a conical disc circulating element has a fixed conical disc and an axially displaceable conical disc. When using contact elements according to the invention in such a CVT transmission, the two discs of a circulating element may be provided with radial slots in which the contact elements are guided radially. In that case, the displacement means are formed by the axially displaceable conical disc. Instead of a transmission element, such as a push belt, a toothed belt or chain or the like, provided with contact elements for positive-locking contact with the engagement members of the contact elements may be provided. In this case, the base part of each of the contact elements, preferably the preferred embodiment in which the engagement part is also movable in the direction of rotation, is preferably adapted to the V-shaped intermediate space between the two conical discs of a conical disc circulating element and, to this end, has two sliding surfaces which mutually enclose an angle, each for sliding abutment against one of the two opposite conical discs. In this case, the base part extends into a first and/or second slot, respectively, associated with that contact element.

The invention also relates to a contact element configured for use in a transmission according to the invention, comprising a base part which is in operative contact with the radial guide and with the displacement means, and an engagement member which is connected to the base part and is movable with respect to the base part, wherein the engagement member of at least one of the number of contact elements of the respective circulating element is in positive-locking contact with at least an engagement element of the number of engagement elements of the transmission element.

The invention also relates to a vehicle, including passenger cars and lorries and cycles and mopeds, provided with a transmission according to the present invention. Advantages of the contact element and of the vehicle according to the invention are analogous to the above-described advantages of the transmission according to the present invention. The transmission according to the invention can also be used advantageously in industrial applications, such as wind turbines.

BRIEF DESCRIPTION OF THE DRAWINGS

The present invention will be described below by means of a preferred embodiment of a transmission according to the present invention with reference to the following diagrammatic figures, in which:

FIG. 3b shows a top view of the component from FIG. 3a, FIG. 3c shows a front view of the component according to FIG. 3a, FIG. 3d shows a cross section A-A according to FIG. 3b, FIG. 4a shows a three-dimensional view of an alternative embodiment of the component in FIG. 3a, likewise in a three-dimensional view, FIG. 4b shows a top view of the component from FIG. 4a, FIG. 4c shows a front view of the component from FIG. 4a, FIG. 4d shows a cross section B-B according to FIG. 4c, FIG. 5a shows an alternative embodiment of the component shown in FIG. 3a, likewise in a three-dimensional view, FIG. 5b shows a top view of the component from FIG. 5a, FIG. 5c shows a front view of the component from FIG. 5a, FIG. 5d shows a cross section A-A according to FIG. 5b, FIG. 5e shows a cross section B-B according to FIG. 5b, FIGS. 5f-h show components of the component according to FIG. 5a, in a three-dimensional view, FIG. 6a shows a hydraulic actuating system for the transmission according to FIG. 1a, FIG. 6b shows a hydraulic diagram of the actuating system according to FIG. 6a, FIG. 7 shows a preferred embodiment of a section of a transmission according to the invention, in a three-dimensional view.

DETAILED DESCRIPTION

Figure 1A:
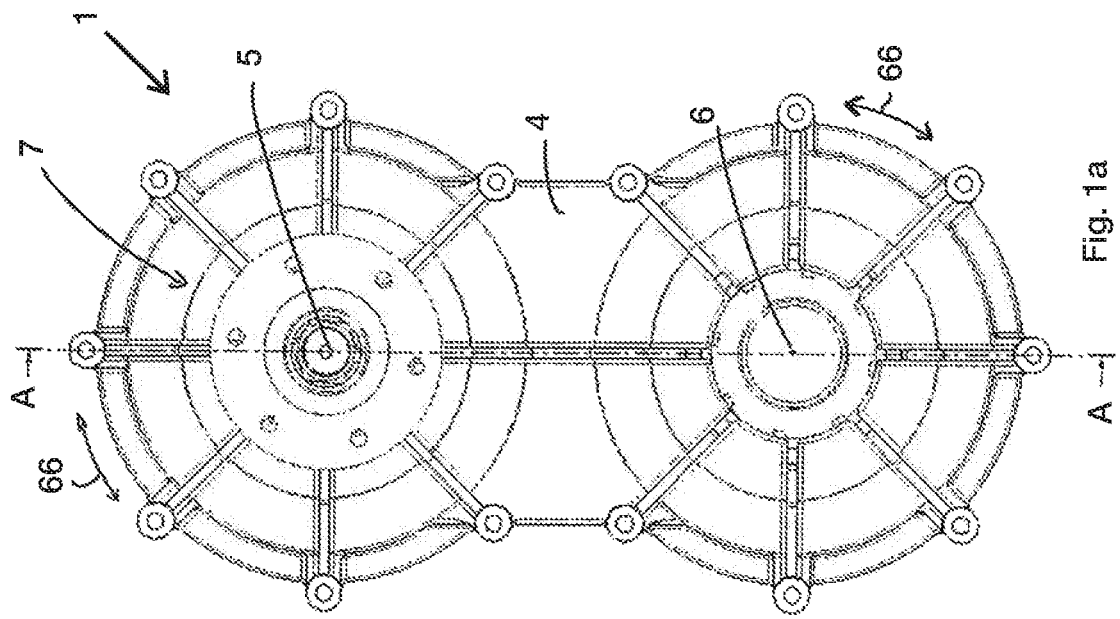
FIG. 1a shows a side view of a preferred embodiment of a transmission according to the present invention.
Figure 1B:
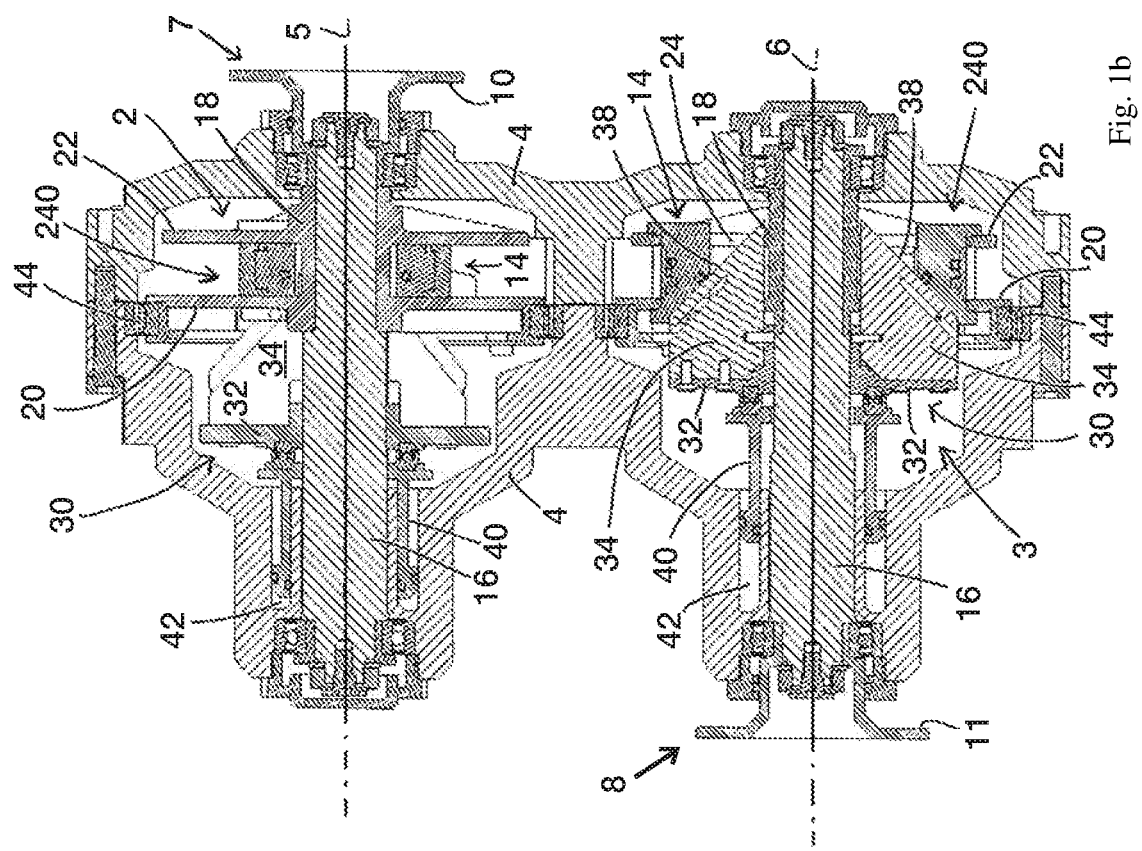
FIG. 1b shows a cross section A-A according to FIG. 1a, FIGS. 2a-2e show various components of the transmission according to FIG. 1a, FIG. 3a shows a preferred embodiment of a component of the transmission according to FIG. 1a in a three-dimensional view.

FIG. 1a, FIG. 1b show a transmission 1 according to the present invention, by means of which a transmission ratio between an input shaft 7 and an output shaft 8 can be set in a continuously variable way. The transmission 1 has a first circulating element 2 which comprises the input shaft 7 and a second circulating element 3 which comprises the output shaft 8. The first circulating element 2 is mounted in a housing 4 and able to rotate about an axis 5, while output shaft 8 is likewise mounted in the housing 4 and able to rotate about an axis 6. The input shaft 7 has a flange 10 by means of which the input shaft 7 can be coupled to a further component of the driveline in which the transmission 1 is incorporated, such as an engine or a clutch provided thereon or a reduction gear. Output shaft 8 is accordingly provided with a flange 11 by means of which the output shaft 8 of the transmission 1 can be coupled to a final drive or shaft, such as to a differential.

Although the exemplary embodiment of a transmission according to the invention shown in the figures is intended for use in a motorised vehicle, such as a car, the present invention also relates to the use of transmissions according to the invention in industrial applications, such as wind turbines, and the use of transmissions in means of transport, such as cycles or mopeds and the like. When using a transmission according to the invention in a cycle, it is advantageous if a circulating element is fitted on the rear shaft of the cycle, analogous to a circulating element 2 or 3 to be described in more detail below. A gear can be fitted to the crankshaft. Using a tension pulley, a variation in length during operation of a transmission element, such as a toothed belt or chain, can be absorbed, which results from the running radius of the transmission element on the rear shaft being variable.

Figure 7:
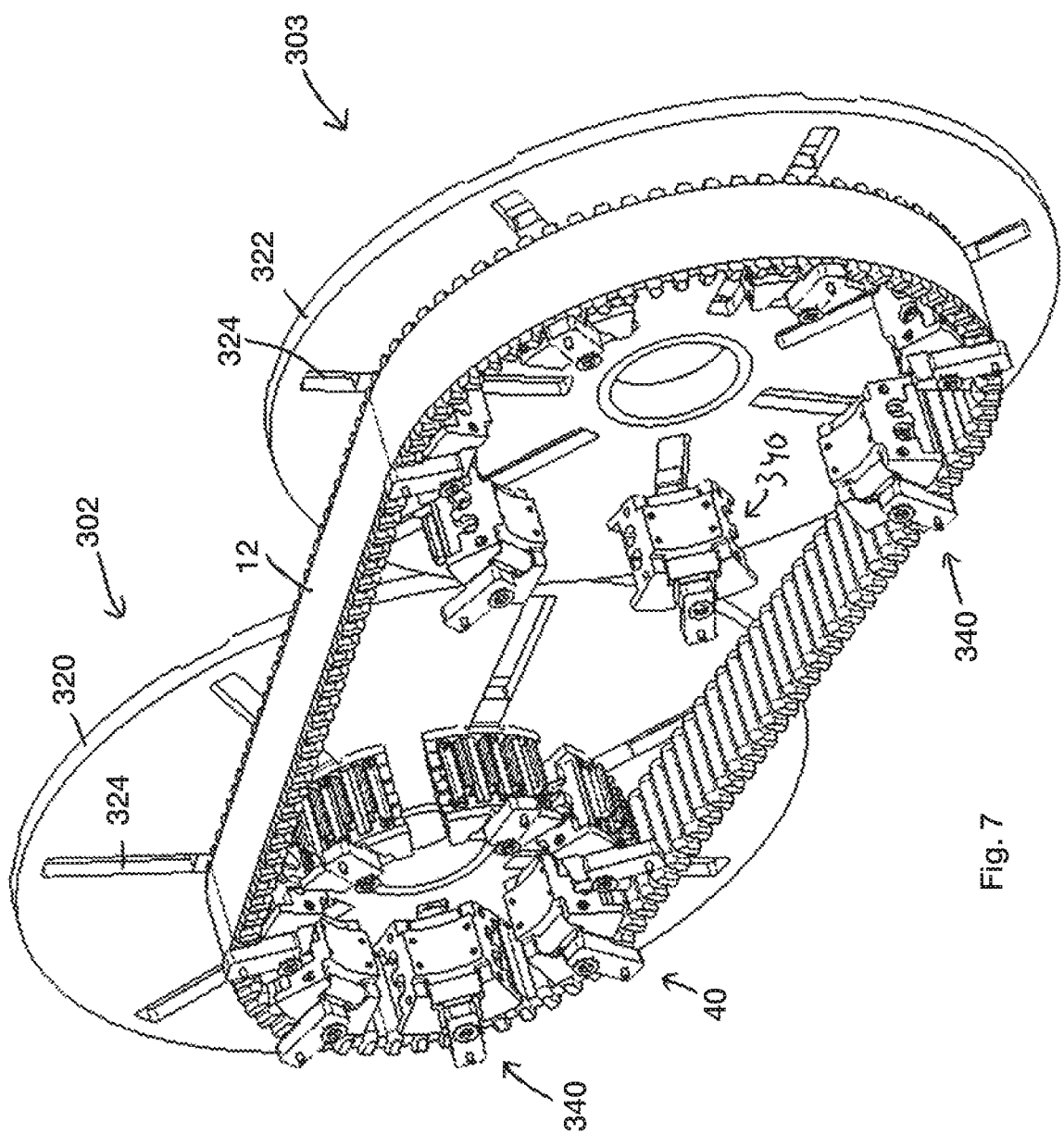

The first circulating element 2 and the second circulating element 3 are accommodated in the housing 4 at a fixed intermediate distance, in practice referred to as the shaft spacing. In particular, the transmission 1 is designed to be used in a vehicle, such as a passenger car. The transmission 1 comprises a transmission element in the form of a toothed belt 12. The toothed belt 12 is shown in FIGS. 7-9. The toothed belt 12 has teeth 13 at a fixed mutual pitch. The toothed belt 12 is passed around the first circulating element 2 and the second circulating element 3 in the direction of rotation 66. The running radius of the toothed belt 12 on the first and second circulating element 2, 3 is determined by six contact elements 240 provided along the circumference thereof for each circulating element 2, 3. The configuration of the contact elements 240 will be explained in more detail below with reference to FIGS. 3a to 4d. The contact elements 240 are displaceable in a radial direction r with respect to the axis 5, 6 of the shaft 7, 8 between an inner radial position, in FIG. 1b shown at the first circulating element 2, and an outer radial position, in FIG. 1b shown at the second circulating element 3. In the outer radial position, the contact elements 240 determine a largest effective running radius at which the toothed belt 12 is passed around the circulating element. In the inner radial position, the contact elements 240 determine a smallest effective running radius at which the toothed belt 12 is passed around the circulating element.

In the exemplary embodiment according to the figures, the first circulating element 2 and the second circulating element 3 are of identical design, although this is not obligatory for the purposes of the present invention. The first circulating element 2 and the second circulating element 3 each have an axle body 16 on which a disc part 18 is provided, comprising a first disc 20 and a second disc 22 provided parallel thereto, which form the first and second disc element, respectively. In the present exemplary embodiment, first disc 20 and second disc 22 are an integral component of disc body 18. First and second disc 20, 22 are substantially flat and extend radially and are situated at a mutual distance apart with the contact elements 240 being enclosed between flat, mutually facing sides of the first and second disc 20, 22. The first disc 20 and second disc 22 are each provided with a mutually aligned radial guide for the contact elements 240 which is formed by respectively six radial slots 24 which are distributed evenly over the circumference of the respective disc and in which the contact elements extend. The radial slots 24 of the first and second disc 20, 22 are in each case mutually aligned. See also FIGS. 2a, 2b, 2d and 2e. As a result, the contact elements 240 are able to perform a purely radial reciprocating movement between the inner and the outer radial position in which they are guided by the radial slots 24. The disc body 18 is secured against rotation with respect to the axle body 16 by means of a splined connection 26.

The first and second circulating element 20, 22 also comprise an actuator 30 which forms the displacement element of the displacement means which has a support disc 32 with a hexagonal borehole 36 which is secured against rotation due to the hexagonal shape and can move in an axial direction over the axle body 16, 18 which, at the location of the actuator 30, has a hexagonal outer contour. Actuator 30 furthermore has six pressure elements 34, see in particular FIGS. 1a and 2c. Pressure elements 34 are positioned in such a way that they can each penetrate to below the contact elements 14 through a radial slot 24 of the first disc 20. The pressure elements 34 have an oblique wedge face which forms a contact face 38, in which case, due to the actuator 30 moving in the direction of the second disc 22, the contact elements 240 move along the contact faces 38 outwards in the direction of the outer radial position thereof, and vice versa. Thus, it is possible to enforce a radial displacement of the contact elements 240 by an axial displacement of the actuator 30 in order thus to determine the running radius of the toothed belt 12 on the first and second circulating element 2, 3. The angle of the contact face 38 with respect to the axial direction of the associated circulating element, or with respect to an axis 5 or 6, is 45 degrees, but may also be greater or smaller in an alternative embodiment. Preferably, the angle is in the range from 30 to 80 degrees. Via a bearing, the actuators 30 of the first and second circulating element 2, 3 are connected to a bushing 40, whose free end facing away from the actuator 30 is inserted in an annular oil chamber 42. The bushing 40 and annular oil chamber 42 are mutually sealed in such a way that an axial displacement of the bushing 40 and thus of actuator 30 can be enforced on account of an oil pressure in the oil chamber 42.

In order to increase the flexural stiffness of the first circulating element 2 and the second circulating element 3, the first discs 20 thereof are directly mounted with respect to the housing 4 via support bearing 44 along the outer circumference.

FIGS. 3a-3d show a first preferred embodiment of a contact element 240 according to the present invention, which contact element 240 is also shown in FIGS. 1b and 2a. The contact element 240 substantially consists of a base part 250 which is configured to cooperate with the slots 24 of the radial guide and with the pressure elements 34 of actuator 30 which form the axial displacement means. Furthermore, the contact element 240 has an engagement member 252 which is formed by five key-shaped lugs 254, each of which extend in an axial direction, that is to say in the fitted position of the contact elements 240 in the transmission 1. Together, the lugs 254 form the engagement member 252 of a contact element 240. As is shown in particular in FIG. 3b, the key-shaped lugs 254 are provided at a mutually equal pitch in the direction of rotation 66, which pitch is identical to the pitch between successive teeth of toothed belt 12. Therefore, the lugs can fall between successive teeth of toothed belt 12 in a positive-locking manner, that is to say during operation of the transmission 1 in which the contact elements 240 are provided. The lugs 254 are movable between a first end position, in which they are recessed completely below the external surface 268 of base part 250, and a second end position, which is shown in FIGS. 3a-3d, in which they project beyond the curved external surface 268. The lugs 254 are forced to the second end position by pressure springs 272 which are provided under each of lugs 254. With contact elements 240, the running radius of the toothed belt 12 is thus determined by the outer face 268 of the base part 250.

When the first and second circulating elements 2, 3 rotate while using such contact elements 140 in the transmission 1, a number of lugs may possibly, depending on the mutual position of the teeth of toothed belt 12 and the lugs 154 of contact element 140, fall exactly between successive teeth of the toothed belt 12 upon first contact between the contact elements 140 and toothed belt 12, as a result of which these may remain in the second end position. The heads of the teeth of toothed belt 12 furthermore rest on the curved external surface 168 of base part 150. The running radius of the toothed belt 12 is thus determined by the radial position of the base part 150, in which case the engagement member 152 may effect a positive-locking contact with the teeth of toothed belt 12 in the form of the lugs 154. As the lugs 154 are arranged in rows which are placed at a mutually different position in the direction of rotation 66, it is ensured with a greater degree of certainty that a positive-locking contact of four or more lugs 154 with the toothed belt 12 is brought about. With this arrangement, there will in each case be positive-locking contact between at least one contact element 140 of the contact elements 140 on a respective circulating element 2 or 3 during operation, whereas, when using the contact elements 240, all contact elements 240 which are situated on the part of the circumference of the circulating element 2, 3 around which the toothed belt 12 is passed (that is to say along half the circumference on average) are in each case in positive-locking contact with the toothed belt 12.

When, during operation of the transmission 1, the circulating element 2 is rotatably driven and the second circulating element 3 also rotates via the toothed belt 12, the contact elements 240 of each of the circulating elements 2, 3, or at least the lugs 245 thereof, will successively come into contact with the toothed belt 12 and be in contact with the toothed belt 12 for a part of a single rotation of circulating element 2, for approximately half a rotation thereof on average. Subsequently, the contact elements 240 come away from toothed belt 12 in order then again to come into contact with toothed belt 12 upon further rotation of circulating element 2.

A width of the engagement member 252, that is to say its extent in the axial direction of the associated circulating element 2, 3, is such that it fits exactly between the first disc 20 and the second disc 22 of the disc body 18. This also applies to the base part 250. See in particular the top view according to FIG. 3b in this respect. On both sides next to the engagement member 252, the base part 250 is provided with constrictions 56, 56' which are configured to pass through the radial slots 24. The widened end portions 58, 58' further enclose the contact elements 240 axially with respect to the first and second disc 20, 22.

On its side facing the actuator 30, the underside of the base part 250 has a recess with an oblique face 60 which, in the fitted position, makes at least approximately the same oblique angle as the contact face 38 of the pressure elements 34 and is provided in line with the radial slots 24. Furthermore, a roller 262 is provided which is recessed for the major part in the surface 60 and which contributes to the smooth movement of the contact elements 240 to and fro over contact face 38 with low friction.

In order to keep the contact elements 240 in contact with the pressure elements 34 of actuator 30 and to prevent the contact elements 240 from inadvertently moving radially outwards at an elevated rotary speed on account of the centrifugal force, the contact elements 240 furthermore comprise two small guide projections 64 which, in the fitted position, engage in guide grooves 39 which run on either side of each of the pressure elements 34 near the contact face 38. See also FIG. 2c.

FIGS. 4a-4d show an alternative embodiment 140 of a contact element 240 which can be used for a transmission such as transmission 1 according to the present invention. That is to say, the contact elements 240 may be replaced by contact elements 140. Components having a similar function are denoted by reference numerals to which 100 has been added or from which 100 has been subtracted. The contact elements 240 may be replaced by contact elements 140, since the section of the base part 150 of the contact elements 140 which is in operative contact with the radial guide and the axial displacement means is of a similar design as the base part 250, as has been described above. Contact elements 140 are composed of a base part 150 and an engagement member 152 which is formed by twelve lugs 154 which are provided in the curved outer face 168 of base part 150. The lugs 154 are only displaceable with respect to the base part 150 to and fro in the radial direction r, as is shown in particular in FIG. 4d. The lugs 154 are provided in three rows of four, viewed in the direction of rotation, next to each other on the curved surface 168, with the central row of lugs 154 being offset by half a pitch with respect to the two outer rows of lugs 154 on either side thereof. See in particular FIG. 4b. The pitch between the lugs 154 of a row is equal to the pitch between the separate lugs 254 of contact elements 240 and are therefore suitable to fall between successive teeth of toothed belt 12 during operation of the transmission 1 in which the contact elements 140 are provided.

The lugs 154 are displaceable between a first end position, in which they are completely recessed in the curved surface 168, and a second end position, in which the lugs 154 project beyond the curved surface 168. As in particular FIGS. 4a, 4c, and 4d show, the central row of lugs is provided in the second end position thereof. The lugs 154 are forced towards this second end position by a radial pressure spring 172 provided under each of the lugs 154.

When the first and second circulating elements 2, 3 rotate while using such contact elements 140 in the transmission 1, a number of lugs may possibly, depending on the mutual position of the teeth of toothed belt 12 and the lugs 154 of contact element 140, fall exactly between successive teeth of the toothed belt 12 upon first contact between the contact elements 140 and toothed belt 12, as a result of which these may remain in the second end position. The heads of the teeth of toothed belt 12 furthermore rest on the curved external surface 168 of base part 150. The running radius of the toothed belt 12 is thus determined by the radial position of the base part 150, in which case the engagement member 152 may effect a positive-locking contact with the teeth of toothed belt 12 in the form of the lugs 154. As the lugs 154 are arranged in rows which are placed at a mutually different position in the direction of rotation 66, it is ensured with a greater degree of certainty that a positive-locking contact of four or more lugs 154 with the toothed belt 12 is brought about. With this arrangement, there will in each case be positive-locking contact between at least one contact element 140 of the contact elements 140 on a respective circulating element 2 or 3 during operation.

The hydraulic excitation of the actuators 30 of transmission 1 will be described below with reference to FIGS. 6a and 6b in combination with FIG. 1b. As explained above, each of the circulating elements 2, 3 has an oil chamber 42. By forcing oil or another hydraulic pressure medium into the oil chamber 42, the bushings 40 are moved to the right in the view of the transmission 1 illustrated in FIG. 1b, whereas when oil is removed from the pressure chambers 42, the actuators 30 move to the left, in the view shown in FIG. 1b. Due to the fact that a toothed belt 12 is passed around the circulating elements 2, 3, one of the two actuators 30 will always move axially to one side, while the other actuator will move axially to the other side during operation of the transmission 1. That is to say that, upon axially opposite displacement of the actuators 30, the running radius of the toothed belt 12 becomes larger on the one circulating element and smaller on the other circulating element, as a result of which the transmission ratio of the transmission 1 changes.

Figure 8A:
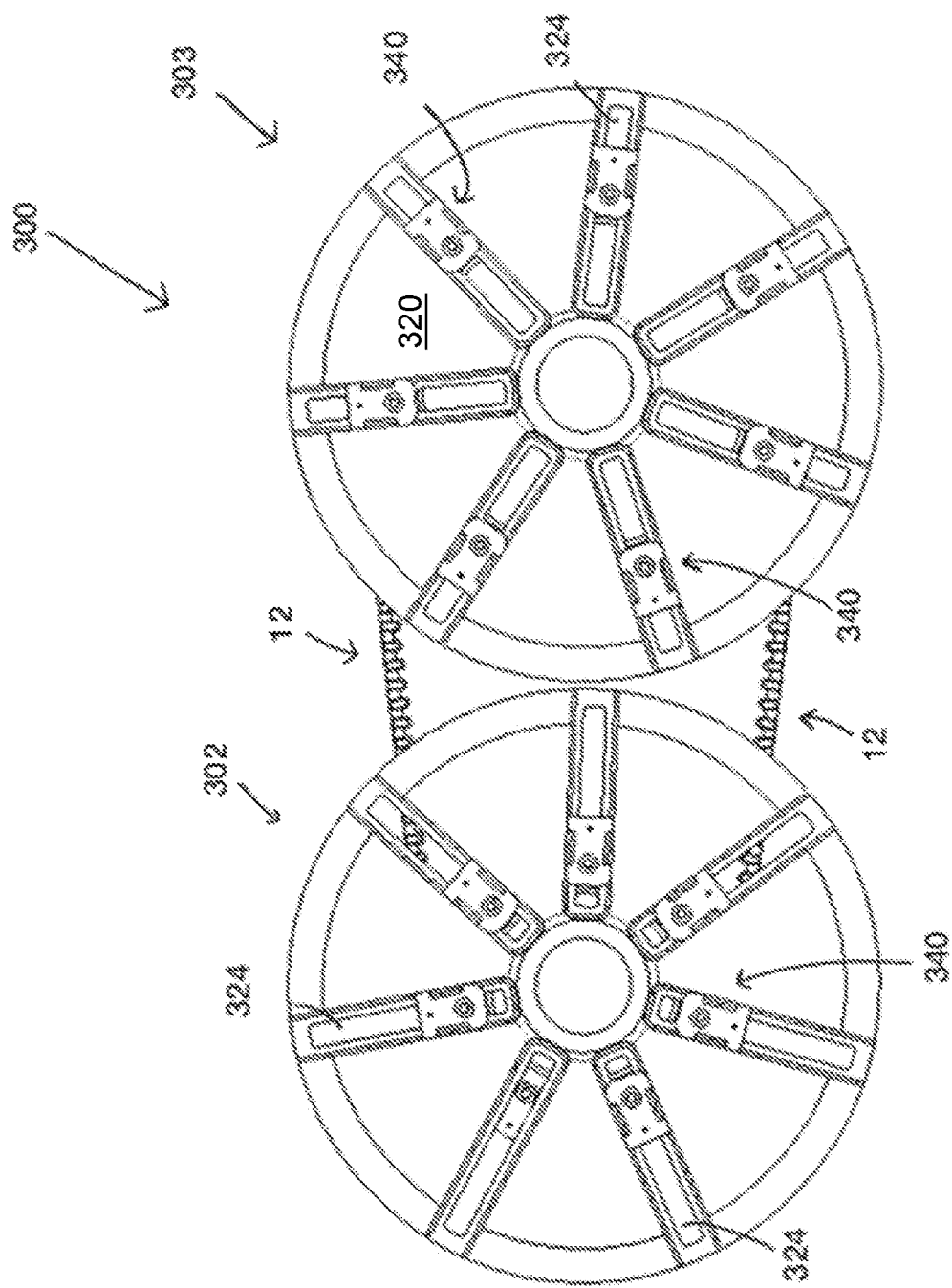
FIGS. 8a-b show a side view and front view, respectively, of the transmission according to FIG. 7.
Figure 8B:
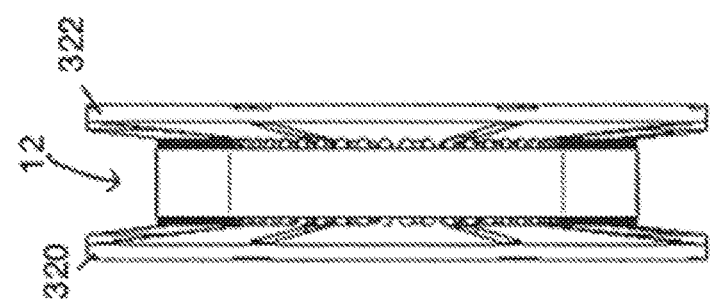
Figure 9:
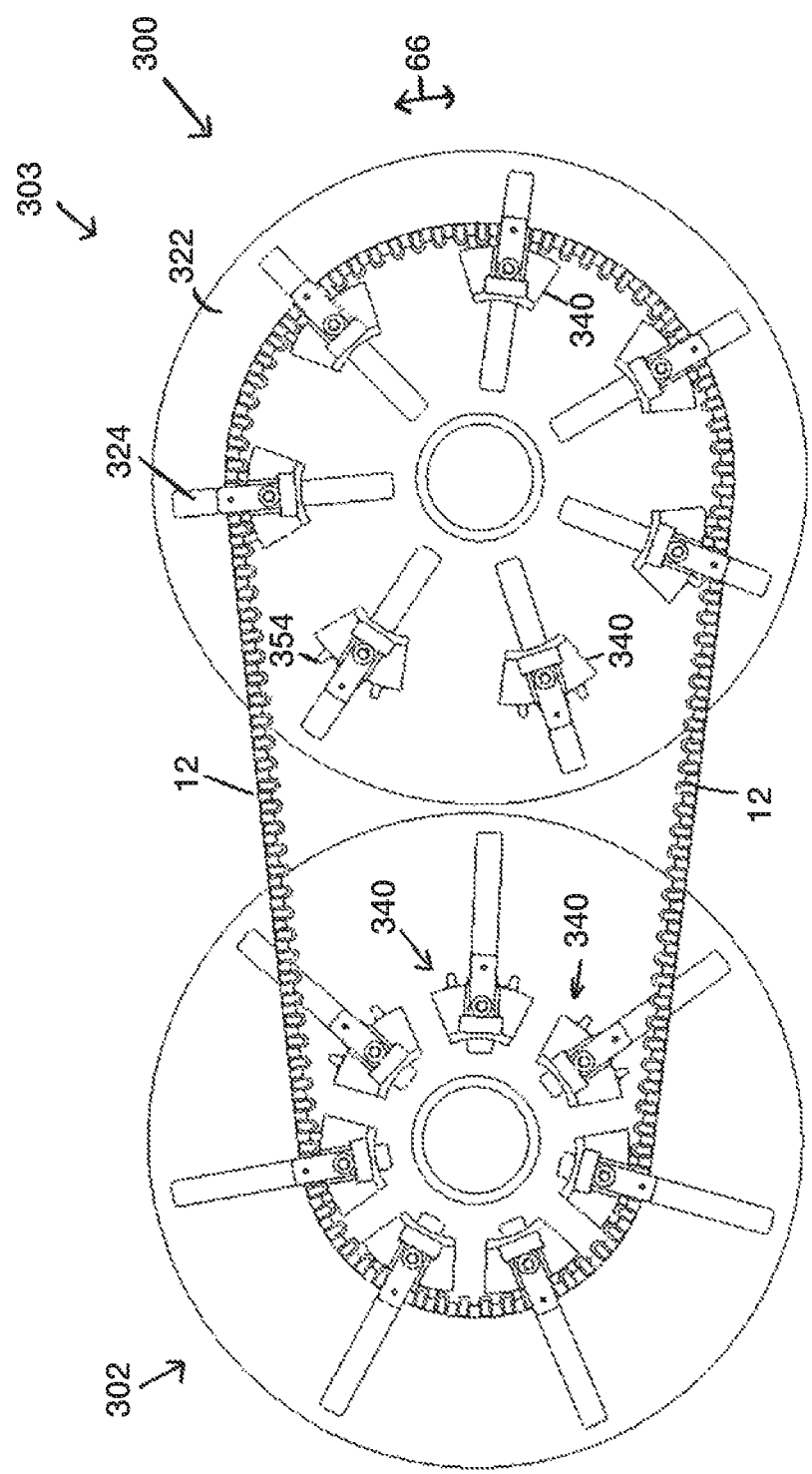
FIG. 9 shows the other side view (of that according to FIG. 8a) of the transmission according to FIG. 7.

The diagrammatically illustrated hydraulic system 80 according to FIGS. 6a and 6b has two hydraulic outlets 81 which are each connected to an oil chamber 42 via a line (not shown in FIG. 8a). Hydraulic system 80 furthermore comprises an oil pump 82 which can be driven by an electric motor 83 by means of electrical actuation of the electric motor 83 (not shown in the figures). Oil pump 82 is connected to a sump 85 via an oil pipe 84 and is connected to a valve member 87 via a line 86. Furthermore, the reservoir 85 is connected to the same valve 87 via an adjustable shut-off valve 88 and a line 89. The valve 87 is actuable in such a way by means of actuating means (not shown) that lines 86 and 89 can be connected to each of the outlets 81 in two separate operating states. That is to say that, in a first operating state, line 86 is connected to a first of the outlets 81, while line 89 is connected to the other of the outlets 81, while the connection with the outlets 81 is reversed in a second operating state. As a result, oil can be forced into a desired oil chamber 42 by the oil pump. The other oil chamber is then connected to the reservoir 85 via valve member 87. In a third operating state, there is no connection between lines 86, 89 and outlets 81. The three operating states of valve member 87 are shown diagrammatically in FIG. 8b, as is the connection between valve member 87 and the two oil chambers 42 (illustrated highly diagrammatically) of the first and second circulating element of the transmission 1.

Using the oil pump 82, hydraulic pressure can be applied to the system, as a result of which a pressure can be generated in the pressure chambers 42 of the transmission 1. Depending on the operating position of valve 87, the oil pump 82 produces an oil pressure in one of the pressure chambers 42 via line 86 and one of the outlets 81. Since the pressure chambers are coupled to each other via the actuators 30 and the toothed belt 12, an oil pressure is also produced in the other of the pressure chambers 42 which is adjusted by suitable operation of the adjustable shut-off valve 88. In this way, a desired hydraulic pressure can be generated in both pressure chambers 42 by suitable operation of oil pump 82 and valves 87 and 88 in order to regulate the transmission ratio of transmission 1.

FIGS. 5a to 5h show a further preferred embodiment of contact elements according to the present invention, in the form of contact elements 340 whose key-shaped lugs 354 have a great degree of similarity with the key-shaped lugs 254. Together, the lugs 354 form the contact member 352 of a contact element 340.

As in particular FIG. 5b shows, the key-shaped lugs 354 are provided at a mutually equal pitch in the direction of rotation 66, so that the four lugs 354 can be in positive-locking contact with the teeth of toothed belt 12, analogous to the lugs 154 and 254. The lugs 354 can each be moved individually between a first end position, in which they project less far from the external surface 368 of connecting piece part 350 (see for example the leftmost lug 354 in the view according to FIG. 5e), and a second end position, in which the lugs project further from the curved external surface 368, that is to say further than in the first position. See for example the rightmost lug 354 in the view according to FIG. 5e. The lugs 354 are forced towards the second end position by pressure springs 372 which are present under each of the lugs 354. With contact elements 340, the running radius of the toothed belt 12 is thus determined by the curved outer face 368 of a connecting piece 350. Connecting piece 350 is movable with respect to a base part 450 of the contact element 340 in the direction of rotation 66 of the toothed belt 12 around the respective circulating element. The connecting piece 350 has a first part 350a onto which a second part 350b is screwed, which second part determines the outer face 368 of the connecting piece 350. See also FIGS. 5e,5f and 5g.

In a surface 468 of base part 450, two grooves 470 are provided in which spring elements 472 are provided which are configured as pressure springs. On the bottom side of the connecting piece 350, two projections 474 project from the contact surface 469 downwards, which projections 474 are formed in such a way that they fall into the grooves 470. See also FIGS. 5f and 5h. Due to the fact that, for each contact element 340, each of the two springs 472 acts in an opposite direction on one of the two projections 474, the connecting piece 350 is held in a neutral central position with respect to the base part 450 on account of the spring action, as FIGS. 5d and 5e show. As FIG. 5d shows, the connecting piece 350 can now move a little to the right in the figure, in the direction of rotation 66 up to a first end position due to the tolerance 476 which is present behind projection 474. The same applies analogously to FIG. 5e for the movement in the other direction, up to a second end position, in the direction of rotation 66. The total freedom of movement between the first and second end position of connecting piece 350 with respect to base part 450 approximately equals one and a half times the pitch between in each case two lugs 354 of the connecting piece 350.

In contrast to contact elements 140 and 240, the contact element 350 is suitable for use in a conical disc circulating element of a CVT transmission, as will be explained below in more detail. However, the base part 450 of contact element 350 can also be configured analogously to base part 140 or 240, so that it is suitable for use in a transmission according to FIGS. 1a and 1b, that is to say having two flat discs 20, 22. Conversely, the base part of contact elements 140 and 240 can also be configured analogously to base part 450 in order to use a contact element having only the radially movable lugs as engagement member on a conical disc circulating element of a CVT transmission.

In an embodiment of a transmission according to the invention, the circulating element comprising the contact elements, preferably both circulating elements, is a conical disc circulating element of a CVT transmission, wherein the displacement means are formed by an axially displaceable conical disc of the conical disc circulating element. FIGS. 7-9 show a combination of two conical disc circulating elements 302, 303, each having two conical discs 320, 322. Preferably, for each circulating element, one of the two conical discs, for example disc 322, is a fixed conical disc, that is to say a conical disc 322 which is secured against rotation and axial displacement, and the other, in this example then disc 320, is an axially displaceable conical disc. Contact elements 340 are used, which have already been described in detail above. The contact elements are radially guided in radial slots 324 in the two conical discs 320, 322. The displacement means are formed by the axially displaceable conical disc 320 which, when displaced axially, radially moves the contact elements 324. With such an embodiment, a toothed belt, such as toothed belt 12, can again be used. The combination of conical discs 320, 322 and contact elements 340 is fitted onto a shaft of the CVT transmission which, for the remainder, is constructed in a known manner, using hydraulic actuation of pressure chambers in combination with the displaceable conical disc.

According to an aspect of the invention, an existing CVT transmission with a push belt or chain is adapted in the following manner, comprising the following steps:
the push belt or chain is removed from the CVT,
the conical discs of the two circulating elements are adapted in such a manner or replaced that they are provided with radial guide elements, preferably formed by radial slots, in order thus to form the radial guide,
contact elements according to the invention are fitted to the circulating elements, each in cooperation with a radial guide and preferably 4 to 10 pieces distributed over the circumference per circulating element, wherein the base part of the contact elements is configured in such a way that it has contact faces at an angle with respect to the radial for abutment with the two conical discs,
an elongate flexible continuous transmission element is passed around the circulating elements having at least approximately the same length as the push belt or chain originally provided in the CVT which, on the side facing the contact elements, is provided with a number of engagement elements, such as teeth, which are provided at a mutually equal pitch.

The invention claimed is:

1. A transmission, comprising a first circulating element rotatable about a first rotation axis, a second circulating element rotatable about a second rotation axis, and an elongate flexible continuous transmission element which is passed around both the first circulating element and around the second circulating element,
at least one of the first and second circulating elements comprising:
a number of contact elements which are distributed around the rotation axis of the respective circulating element for contact with the transmission element, the contact elements determining a running radius on which the transmission element is passed around the respective circulating element,
a radial guide for each of the contact elements, along which the respective contact elements can be moved to and fro radially between an inner radial position and an outer radial position,
displacement means for moving the contact elements to and fro in the radial direction between the inner and the outer position,
wherein the transmission element is provided with a number of engagement elements which are provided at a regular pitch on a side facing the contact elements, and
each of the contact elements comprising:
a base part which is in operative contact with the radial guide and with the displacement means, and
an engagement member which is connected to the base part and can be moved in a radial direction with respect to the base part,
wherein:
the engagement member of at least one of the number of contact elements of the respective circulating element is in positive-locking contact with at least one engagement element of a number of engagement elements of the transmission element;
the engagement member is also movable in the direction of rotation of the transmission element around the respective circulating element with respect to the base part of the contact element;
the contact element further comprises a connecting piece, wherein the engagement member is held to the connecting piece so as to be movable in a radial direction, and wherein the connecting piece is connected to the base part so as to be movable in the direction of rotation of the transmission element around the respective circulating element with respect to the base part of the contact element; and each contact element of the number of contact elements comprises a spring member which is active between the base part and the connecting piece in order to move the connecting piece to a predetermined neutral position, at least when there is no contact between the engagement member and transmission element.

2. The transmission according to claim 1, wherein the engagement member is configured to be able to move in a radial direction on account of the engagement member and an engagement element of the number of engagement elements of the transmission element coming into contact with each other during rotation of the circulating element.

3. The transmission according to claim 1, wherein each contact element of the number of contact elements comprises a spring member which is active between the base part and the engagement member to move the engagement member to a predetermined neutral position, at least when there is no contact between the engagement member and transmission element.

4. The transmission according to claim 1, wherein the engagement member is formed by a plurality of lug elements which are radially movable with respect to the base part of the contact element and which are preferably arranged at least substantially the same mutual pitch as the pitch between the engagement elements of the transmission element.

5. The transmission according to claim 4, wherein the base part has an external surface which is curved in the direction of rotation of the transmission element around the respective circulating element, wherein the lug elements, in a second end position, radially project beyond the external surface and, in a first end position, radially project beyond the external surface less far than in the second position or are completely recessed radially in the base part below the external surface.

6. The transmission according to claim 5, wherein the predetermined neutral position relates to the second end position.

7. The transmission according to claim 1, wherein the base part has an external surface which is curved in the direction of rotation and along which the connecting piece is movable in the direction of rotation.

8. The transmission according to claim 7, wherein the connecting piece is curved in the direction of rotation, wherein a curvature of an internal surface thereof facing the base part corresponds to the curvature of the external surface of the base part.

9. The transmission according to claim 1, wherein a distance over which the connecting piece can be displaced in the direction of rotation is at least equal to the pitch between the engagement elements of the transmission element and is in the range of 1 or 2 times said pitch.

10. The transmission according to claim 1, wherein the neutral position of the connecting piece is situated midway along said distance.

11. The transmission according to claim 1, wherein the circulating element comprises a first disc element and a second disc element, each of which comprise a first and second radial slot, respectively, for each contact element, which radial slots form the radial guide, wherein the number of contact elements is situated between the first and second disc element and wherein the base part of each of the contact elements extends into a first and second slot associated with that contact element.

12. The transmission according to claim 11, wherein the base part is in contact with the displacement means on the side of the first disc element, and furthermore comprises an axial contact surface which bears against the second disc element.

13. The transmission according to claim 1, wherein the displacement means comprise at least one displacement element with a wedge face, wherein the wedge face and the contact elements are in contact with each other, wherein the at least one displacement element can be moved to and fro in the axial direction with respect to the rotation axis of the circulating element between a first axial position, in which the contact elements are in the inner radial position, and a second axial position, in which the contact elements are in the outer radial position, wherein the contact elements move along the wedge face during such an axial displacement.

14. The transmission according to claim 13, wherein each of the contact elements comprise a rolling wheel which is attached to the base part, which rolling wheel is configured to roll over the wedge face during the axial displacement of the displacement element.

15. The transmission according to claim 1, wherein the circulating element comprising the contact elements is a conical disc circulating element, wherein the displacement means are formed by an axially displaceable conical disc of the conical disc circulating element.

16. A vehicle provided with a transmission according to claim 1.

* * * * *